US011958967B2

United States Patent
Tsuchiya et al.

(10) Patent No.: US 11,958,967 B2
(45) Date of Patent: Apr. 16, 2024

(54) ACRYLIC RESIN COMPOSITION, ADHESIVE AGENT COMPOSITION, BASE FOR ADHESIVE SHEET, AND ADHESIVE SHEET

(71) Applicant: TERAOKA SEISAKUSHO CO., LTD., Tokyo (JP)

(72) Inventors: Yasushi Tsuchiya, Tokyo (JP); Goh Tanaka, Tokyo (JP)

(73) Assignee: Teraoka Seisakusho Co., Ltd. (JP)

( * ) Notice: Subject to any disclaimer, the term of this patent is extended or adjusted under 35 U.S.C. 154(b) by 524 days.

(21) Appl. No.: 16/624,222

(22) PCT Filed: Jun. 22, 2017

(86) PCT No.: PCT/JP2017/022966
§ 371 (c)(1),
(2) Date: Dec. 18, 2019

(87) PCT Pub. No.: WO2018/235217
PCT Pub. Date: Dec. 27, 2018

(65) Prior Publication Data
US 2021/0147670 A1 May 20, 2021

(51) Int. Cl.
*C08L 33/10* (2006.01)
*C08F 20/06* (2006.01)
*C08K 3/40* (2006.01)
*C08K 5/00* (2006.01)
*C09J 7/24* (2018.01)

(52) U.S. Cl.
CPC .............. *C08L 33/10* (2013.01); *C08F 20/06* (2013.01); *C09J 7/24* (2018.01); *C08K 3/40* (2013.01); *C08K 5/0025* (2013.01)

(58) Field of Classification Search
CPC .......... C08L 33/10; C08L 33/14; C08F 20/06; C08F 220/281; C08F 265/06; C08F 120/26; C08F 220/54; C08F 265/04; C08F 220/285; C08F 2810/20; C09J 7/24; C09J 4/06; C09J 7/385; C09J 7/381; C09J 11/04; C09J 133/14; C08K 3/40; C08K 5/0025; C08K 2201/003; C08K 7/28; C08K 5/0016
See application file for complete search history.

(56) References Cited

U.S. PATENT DOCUMENTS

| 9,845,414 | B2* | 12/2017 | Wieneke | B05D 3/067 |
| 2009/0288763 | A1* | 11/2009 | Kiuchi | H01L 21/6835 |
| | | | | 156/247 |
| 2011/0033720 | A1* | 2/2011 | Fujita | C09J 133/14 |
| | | | | 428/522 |
| 2015/0079385 | A1* | 3/2015 | Nishikawa | C09J 7/38 |
| | | | | 428/317.3 |

FOREIGN PATENT DOCUMENTS

| JP | 2001-123136 A | 5/2001 |
| JP | 2002-327160 A | 11/2002 |
| JP | 2009-215355 A | 9/2009 |
| JP | 2010-077287 A | 4/2010 |
| JP | 2011-148889 | 8/2011 |
| JP | 2011-157431 | 8/2011 |
| JP | 2013-100485 A | 5/2013 |
| JP | 2013-199521 | 10/2013 |
| JP | 2016-037609 A | 3/2016 |
| JP | 2016-069480 A | 5/2016 |
| JP | 2017-057371 A | 3/2017 |
| WO | WO-2016/059979 | 4/2016 |

OTHER PUBLICATIONS

Machine English translation of JP 2001-123136 (May 8, 2001) (Year: 2001).*
Mori, machine English translation of JP 2013-199521-A (Year: 2013).*
International Searching Authority, "International Search Report," issued in connection with International Patent Application No. PCT/JP2017/022966, dated Aug. 15, 2017.
International Searching Authority, "Written Opinion," issued in connection with International Patent Application No. PCT/JP2017/022966, dated Aug. 15, 2017.
Office Action dated Aug. 17, 2021 issued in a corresponding Japanese Patent Application No. 2019- 524791, (10 pages).
Reasons for Refusal regarding corresponding Japanese Patent Application No. 2021-185845, dated Dec. 1, 2022, 12 pps. (In English and Japanese.).

* cited by examiner

Primary Examiner — Jessica M Roswell
(74) Attorney, Agent, or Firm — Foley & Lardner LLP

(57) ABSTRACT

Provided is an acrylic resin composition having high chemical resistance and high oil resistance. This acrylic resin composition contains a polymer that includes a unit derived from a predetermined monomer, wherein the proportion of the unit derived from the predetermined monomer contained in the polymer to 100% by mass of all monomer units constituting the polymer is 40-99% by mass, and the tensile strength of the acrylic resin composition after being immersed in oleic acid for 24 hours is 50% or more of the value of the tensile strength thereof before being immersed in oleic acid.

14 Claims, No Drawings

ACRYLIC RESIN COMPOSITION, ADHESIVE AGENT COMPOSITION, BASE FOR ADHESIVE SHEET, AND ADHESIVE SHEET

CROSS-REFERENCE TO RELATED APPLICATION

The present application claims priority under 37 U.S.C. § 371 to International Patent Application No. PCT/JP2017/022966, filed Jun. 22, 2017. The content of the application is hereby incorporated by reference in its entirety.

TECHNICAL FIELD

The present invention relates to an acrylic resin composition, an adhesive agent composition, a base for an adhesive sheet, and an adhesive sheet.

BACKGROUND ART

Acrylic resins are excellent in weather resistance, durability, and high transparency, and are used in a wide variety of applications due to the presence of the large number of monomer species. Among them, (meth)acrylic acid alkyl esters have a low glass transition temperature (Tg) and excellent rubber elasticity when made into a homopolymer, and the polymer itself exhibits stickiness, so that they are often used in the fields of acrylic rubbers, binders and adhesives. Many of the polymers of (meth)acrylic acid alkyl esters are produced by a solution polymerization method. As can be seen from this, the polymer has a solubility parameter close to that of general industrial organic solvents such as toluene, ethyl acetate, and methyl ethyl ketone, and is easily soluble in these organic solvents.

In recent years, mobile devices represented by smartphones and tablet PCs have rapidly spread. In many of these mobile devices, the display panel and the housing are bonded with an acrylic binder or a double-sided adhesive tape. The mobile device is equipped with a touch panel, which is operated by touching with a person's finger, or touches the face of a person when making a call. When the touch panel touches a human hand or face, oily components such as sebum and finger oil adhere to the touch panel. The oil component includes components such as oleic acid, and the component has an SP value close to that of an industrial organic solvent and dissolves a general acrylic resin. If it is an industrial organic solvent, it has a low boiling point, so it will vaporize in a short time and will not damage the binder or adhesive. However, oil components such as oleic acid have a high boiling point and do not vaporize in the living environment. For this reason, such a component remains on the electronic device, it will damage the binder or adhesive. Therefore, parts of the electronic device will cause to floating or peeling off, and the life of the electronic device is shortened.

In addition, the double-sided adhesive tape for structural bonding used in industrial fields such as building materials, automobiles, home appliances, and large-scale electronic devices uses acrylic foam with excellent flexibility and stress followability as a base material in many cases. However, in building materials, when chemicals such as a detergent for cleaning the floor or wax adhere, the double-sided adhesive tape having the acrylic foam base material is damaged. In exterior parts of automobiles, there are cases where detergent and wax at the time of car washing, gasoline during refueling or the like adheres, and these also dissolve or swell general acrylic resins. Even in home appliances, clothes detergents and softeners in the case of washing machines, and cooking oils in the case of microwave ovens and refrigerators may adhere. In addition, since these home appliances are touched and operated by human hands, finger oil adheres to them. As described above, the double-sided adhesive tape having an acrylic foam base material made of a general acrylic resin is damaged by chemicals and oil components, resulting in a malfunction of the product or a shortened life.

Patent Document 1, for example, discloses a photocurable coating composition containing a specific acrylic polyol resin, a polyfunctional photocurable compound and a polyisocyanate compound at a specific ratio and it describes that a coating having high chemical resistance can be obtained by performing two curing reactions of a urethane bond formation reaction between the acrylic polyol resin and the polyisocyanate compound and a radical polymerization reaction of the polyfunctional photocurable compound with a photopolymerization initiator. Patent Documents 2 and 3 describe that a resin composition containing an acrylic resin mainly composed of n-butyl acrylate units is resistant to oleic acid and artificial sebum. Patent Document 4 discloses that an adhesive composition containing an acrylic resin mainly composed of an alkyl (meth)acrylate unit having an alkyl group of 1 to 6 carbon atoms is resistant to sebum and cosmetics.

PRIOR ART DOCUMENT

Patent Document

Patent Document 1: JP 2016-37609 A
Patent Document 2: JP 2009-215355 A
Patent Document 3: JP 2013-100485 A
Patent Document 4: JP 2017-57371 A

SUMMARY OF THE INVENTION

Problems to be Solved by the Invention

However, the techniques described in Patent Documents 1 to 4 are insufficient in chemical resistance and oil resistance, and further improvements are desired.

An object of the present invention is to provide an acrylic resin composition having high chemical resistance and high oil resistance. Moreover, another object of the present invention is to provide an adhesive composition made of the acrylic resin composition, a base material for adhesive sheets containing the acrylic resin composition, and an adhesive sheet.

Means for Dissolving the Problems

The acrylic resin composition according to the present invention is an acrylic resin composition including a polymer containing a unit derived from a monomer represented by the following formula (1):

[Chem. 1]

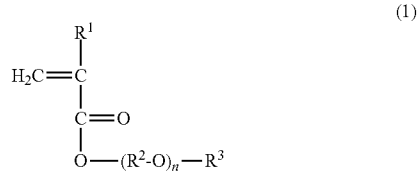

(In the formula (1), $R^1$ represents a hydrogen atom or a methyl group, $R^2$ represents an alkylene group having 2 to 4 carbon atoms, and $R^3$ represents an alkyl group having 1 to 10 carbon atoms, and n represents an integer of 1 to 20), wherein the proportion of the unit derived from the monomer represented by formula (1) contained in the polymer is 40 to 99% by mass with respect to 100% by mass of the total monomer units constituting the polymer, and the tensile strength after the acrylic resin composition is immersed in oleic acid for 24 hours is 50% or more of the value of the tensile strength before being immersed in oleic acid.

The adhesive composition according to the present invention includes the acrylic resin composition according to the present invention.

The base material for adhesive sheets according to the present invention includes the acrylic resin composition according to the present invention.

The adhesive sheet according to the present invention includes the adhesive composition according to the present invention and/or the base material for adhesive sheets according to the present invention.

Effects of the Invention

The present invention can provide an acrylic resin composition having high chemical resistance and high oil resistance. Moreover, the present invention can provide an adhesive composition made of the acrylic resin composition, a base material for adhesive sheets and an adhesive sheet containing the acrylic resin composition.

MODE FOR CARRYING OUT THE INVENTION

[Acrylic Resin Composition]

The acrylic resin composition according to the present invention includes a polymer containing the unit derived from the monomer represented by the formula (1). Here, the proportion of the unit derived from the monomer represented by the formula (1) contained in the polymer is 40 to 99% by mass with respect to 100% by mass of all monomer units constituting the polymer. Moreover, the tensile strength after immersing the acrylic resin composition in oleic acid for 24 hours is 50% or more of the value of the tensile strength before immersing in oleic acid.

The present inventors have found that an acrylic resin composition having a high chemical resistance and a high oil resistance can be obtained by which the polymer contained in the acrylic resin composition mainly contains units derived from the monomer represented by the formula (1). Specifically, the inventors have found that the tensile strength when the resin composition was immersed in oleic acid for 24 hours can be maintained at 50% or more of the tensile strength value before being immersed in oleic acid, if the proportion of the unit derived from the monomer represented by the formula (1) contained in the polymer is 40 to 99% by mass with respect to 100% by mass of all monomer units constituting the polymer. When the polymer (acrylic resin) contained in the acrylic resin composition mainly contains the unit derived from the monomer represented by the formula (1), the polarity of the acrylic resin is increased, the difference between the solubility parameter of the acrylic resin and the solubility parameter of substances such as the chemical compounds or the oil components becomes large. Therefore, it is estimated that the chemical resistance and oil resistance of the acrylic resin composition are improved.

Hereinafter, embodiments of the acrylic resin composition according to the present invention will be described. Noted that, "(meth)acrylic acid" refers to acrylic acid and methacrylic acid. Moreover, the acrylic resin composition according to the present invention contains preferably 70% by mass or more, and more preferably 80% by mass or more of the polymer containing the unit derived from the monomer represented by formula (1).

(Monomer Represented by Formula (1))

In the formula (1), $R^1$ represents a hydrogen atom or a methyl group. $R^2$ represents an alkylene group having 2 to 4 carbon atoms, preferably an alkylene group having 2 or 3 carbon atoms, and more preferably an ethylene group. $R^3$ represents an alkyl group having 1 to 10 carbon atoms, preferably an alkyl group having 1 to 5 carbon atoms, and more preferably an alkyl group having 1 to 3 carbon atoms. n represents an integer of 1 to 20, preferably an integer of 1 to 15, and more preferably an integer of 1 to 10.

Specific examples of the monomer represented by the formula (1) include (meth)acrylic acid alkoxyalkyl esters such as methoxyethyl (meth)acrylate, methoxypropyl (meth)acrylate, methoxypropyl (meth)acrylate, methoxybutyl (meth)acrylate, ethoxyethyl (meth)acrylate, ethoxypropyl (meth)acrylate and ethoxybutyl (meth)acrylate; (meth)acrylic ester of polyoxyalkylene glycol monoalkyl ether such as methoxy (poly) ethylene glycol (meth)acrylates such as methoxy diethylene glycol (meth)acrylate and methoxy triethylene glycol (meth)acrylate, ethoxy (poly) ethylene glycol (meth)acrylates such as ethoxy diethylene glycol (meth)acrylate and ethoxy triethylene glycol (meth)acrylate, methoxy (poly) propylene glycol (meth)acrylates such as methoxy dipropylene glycol (meth)acrylate and methoxy tripropylene glycol (meth)acrylate, and ethoxy (poly) propylene glycol (meth)acrylates such as ethoxy dipropylene glycol (meth)acrylate and ethoxy tripropylene glycol (meth)acrylate. Among them, from the viewpoint of better chemical resistance and oil resistance, methoxyethyl (meth)acrylate, ethoxyethyl (meth)acrylate, methoxy (poly) ethylene glycol (meth)acrylate and ethoxy (poly) ethylene glycol (meth)acrylate are preferred, and methoxyethyl (meth)acrylate is more preferred. In particular, 2-methoxyethyl acrylate is useful as a component of adhesives and binders because its homopolymer has a low Tg of −50° C. and is similar to a monomer often used for acrylic adhesive components. These monomers can be used alone or in combination of two or more thereof.

The proportion of units derived from the monomer represented by the formula (1) contained in the polymer with respect to 100% by mass of all monomer units constituting the polymer is 40 to 99% by mass, preferably 45 to 95% by mass, more preferably 50 to 92% by mass, and still more preferably 55 to 90% by mass. When the proportion is less than 40% by mass, chemical resistance and oil resistance will fall. Moreover, when the proportion exceeds 99% by mass, the proportion of the unit derived from the reactive monomer aiming at crosslinking will become relatively small. In addition, the proportion is a weight ratio as a monomer of the unit derived from the monomer represented by the formula (1) included in the polymer when the total weight as the monomers of all the monomer units constituting the polymer is 100% by mass. The same applies to the proportions of units derived from other monomers described later.

((Meth)acrylic Acid Alkyl Ester)

The polymer can further contain a unit derived from (meth)acrylic acid alkyl ester. When the polymer contains a unit derived from (meth)acrylic acid alkyl ester, an acrylic resin composition that is usable for various purposes can be obtained. Specific examples of (meth)acrylic acid alkyl esters include methyl (meth)acrylate, ethyl (meth)acrylate, propyl (meth)acrylate, butyl (meth)acrylate, isobutyl (meth) acrylate, tertiary-butyl (meth)acrylate, isobutyl (meth)acrylate, hexyl (meth)acrylate, isohexyl (meth)acrylate, octyl (meth)acrylate, isooctyl (meth)acrylate, ethylhexyl (meth) acrylate, nonyl (meth)acrylate, isononyl (meth)acrylate, decyl (meth)acrylate, isodecyl (meth)acrylate, dodecyl (meth)acrylate, isododecyl (meth)acrylate, isobornyl (meth) acrylate, cyclohexyl (meth)acrylate. These can be used alone or in combination of two or more thereof.

The proportion of the unit derived from the (meth)acrylic acid alkyl ester contained in the polymer with respect to 100% by mass of all monomer units constituting the polymer is preferably 0.1 to 40% by mass, more preferably 5 to 35% by mass, and still more preferably 10 to 30% by mass. When the proportion is 40% by mass or less, the proportion of the unit derived from the monomer represented by the formula (1) can be increased, and the chemical resistance and oil resistance of the acrylic resin composition are improved.

(Carboxylic Acid-Containing (Meth)Acrylic Monomer)

The polymer preferably further includes units derived from a carboxylic acid-containing (meth)acrylic monomer. When the polymer contains a unit derived from a carboxylic acid-containing (meth)acrylic monomer, the strength of the acrylic resin composition can be further improved. Specific examples of the carboxylic acid-containing (meth)acrylic monomer include (meth)acrylic acid, β-carboxyethyl (meth) acrylate, itaconic acid, crotonic acid, maleic acid, fumaric acid and the like. Among them, (meth)acrylic acid is preferable from the viewpoint of higher strength of the acrylic resin composition. These can be used alone or in combination of two or more thereof.

The proportion of the unit derived from the carboxylic acid-containing (meth)acrylic monomer contained in the polymer with respect to 100% by mass of all monomer units constituting the polymer is preferably 0.5 to 20% by mass, more preferably 5 to 18% by mass, still more preferably 10 to 17% by mass and most preferably 11 to 15% by mass. When the proportion of the carboxylic acid-containing (meth)acrylic monomer is 0.5% by mass or more, the strength of the acrylic resin composition can be further improved, and the reaction point with a crosslinking agent such as an epoxy-based crosslinking agent can be imparted.

(Nitrogen-Containing Acrylic Monomer)

The polymer preferably further contains a unit derived from a nitrogen-containing acrylic monomer. When the polymer contains the unit derived from the nitrogen-containing acrylic monomer, the strength and heat resistance of the acrylic resin composition can be improved, and chemical resistance and oil resistance are also improved. Specific examples of the nitrogen-containing acrylic monomer include (meth)acrylamide, N-alkyl-substituted (meth)acrylamides such as N-isopropyl (meth)acrylamide, N,N-dialkyl-substituted (meth)acrylamides such as N,N-dimethyl (meth) acrylamide and N,N-diethyl (meth)) acrylamide, acryloylmorpholine, vinylpyridine, N-vinylpyrrolidone, aminoethyl (meth)acrylate, dimethylaminoethyl (meth)acrylate, and dimethyl aminopropyl (meth)acrylate. Among them, (meth)acrylamide, N-alkyl-substituted (meth)acrylamides, N,N-dialkyl-substituted (meth)acrylamides, and acryloylmorpholine are preferable from the viewpoint of versatility and commercialization. These can be used alone or in combination of two or more thereof.

The proportion of the unit derived from the nitrogen-containing acrylic monomer contained in the polymer with respect to 100% by mass of all the monomer units constituting the polymer is preferably 1 to 50% by mass, more preferably 5 to 40% by mass, and still more preferably 10 to 30% by mass. When the proportion is 1% by mass or more, the resin modification is effective. Moreover, when the proportion is 50% by mass or less, an acrylic resin composition is applicable to various uses.

(Other Monomers)

In addition to the aforementioned monomer-derived units, the polymer can contain a unit derived from hydroxyl group-containing co-polymerizable monomer such as 2-hydroxyethyl (meth)acrylate, 2-hydroxypropyl (meth)acrylate, 2-hydroxybutyl (meth)acrylate, 4-hydroxybutyl (meth)acrylate, 2-hydroxyhexyl (meth)acrylate, monoester of (meth) acrylic acid and polyethylene glycol or polypropylene glycol, or the like.

(Polymerization Method)

The polymerization method of the monomer composition containing the above-mentioned monomers is not particularly limited. For example, in various polymerization methods such as solution polymerization, bulk polymerization, suspension polymerization, emulsion polymerization, means such as photopolymerization or thermal polymerization can be used. Furthermore, polymerization by radiation such as gamma rays and electron beam polymerization can also be used. The photopolymerization can be performed, for example, by irradiating the monomer composition with UV rays in the presence of a photopolymerization initiator. The thermal polymerization can be performed, for example, by heating the monomer composition to 50 to 200° C. in the presence of a thermal polymerization initiator.

(Crosslinking Agent)

The acrylic resin composition according to the present invention preferably further contains a crosslinking agent from the viewpoint of forming a crosslinked structure. The crosslinking agent is preferably, from the viewpoint of reactivity with an acrylic resin composition, at least one crosslinking agent selected from the group consisting of a polyfunctional (meth)acrylic monomer, a polyfunctional (meth)acrylic oligomer, a bifunctional or higher functional glycidyl group-containing compound, and a bifunctional or higher functional isocyanate group-containing compounds.

Specific examples of the polyfunctional (meth)acrylic monomer include trimethylolpropane tri(meth)acrylate, pentaerythritol tetra(meth)acrylate, 1,2-ethylene glycol di(meth)acrylate, 1,6-hexanediol di(meth)acrylate, 1,12-dodecanediol di(meth)acrylate, polyethylene glycol di(meth) acrylate, polypropylene glycol di(meth)acrylate and the like.

Specific examples of polyfunctional (meth)acrylic oligomers include urethane (meth)acrylates and epoxy (meth) acrylates that are oligomerized by reacting a compound having a plurality of isocyanate groups or glycidyl groups with (meth)acrylic acid or a hydroxyl group-containing (meth)acrylate.

Examples of the bifunctional or higher functional glycidyl group-containing compounds include 1,3-bis(N,N-diglycidylaminomethyl) cyclohexane, N,N,N',N'-tetraglycidyl-m-xylenediamine, N,N,N',N'-tetraglycidylaminophenyl methane, triglycidyl isocyanurate, m-N,N-diglycidylaminophenyl glycidyl ether, N,N-diglycidyl toluidine, N,N-diglycidyl aniline, pentaerythritol polyglycidyl ether and 1,6-hexanediol diglycidyl ether.

Examples of the bifunctional or higher functional isocyanate group-containing compounds include isocyanate monomers such as tolylene diisocyanate (TDI), chlorophenylene diisocyanate, hexamethylene diisocyanate, tetramethylene diisocyanate, isophorone diisocyanate, diphenylmethane diisocyanate, hydrogenated diphenylmethane diisocyanate; isocyanate compounds that these isocyanate monomers are added to trimethylolpropane; isocyanurate compounds; biuret-type compounds and urethane prepolymer-type isocyanates added the isocyanate monomers to polyether polyols, polyester polyols, acrylic polyols, polybutadiene polyols, polyisoprene polyols. These crosslinking agents can be used singly or in combination of two or more thereof.

The amount of the crosslinking agent in the acrylic resin composition is preferably 0.01 to 10 parts by mass, and more preferably 0.03 to 1 part by mass, and further preferably 0.05 to 0.5 parts by mass with respect to 100 parts by mass of the polymer (total monomers before polymerization).

(Hollow Microfiller)

The acrylic resin composition according to the present invention can contain a hollow microfiller as a filler from the viewpoint of imparting strength and reducing weight. Examples of the hollow microfillers include hollow glass beads and hollow resin balloons. Among them, hollow glass beads are preferable from the viewpoint of chemical resistance and oil resistance. The average particle size of the hollow microfiller is preferably 1 to 100 μm, more preferably 10 to 50 μm. The content of the hollow microfiller in the acrylic resin composition is preferably 2 to 50 parts by mass, more preferably 5 to 30 parts by mass, further preferably 10 to 20 parts by mass with respect to 100 parts by mass of the polymer. In order to improve the dispersibility in the acrylic resin composition, the hollow microfiller can be appropriately subjected to a surface treatment such as a coupling treatment or a stearic acid treatment.

(Flame Retardant)

The acrylic resin composition according to the present invention can contain a flame retardant. Examples of the flame retardants include phosphorus flame retardants such as ammonium polyphosphate and phosphate esters, melamine flame retardants such as melamine sulfate and melamine (poly)phosphate, metal hydroxides, and the like. Among them, ammonium polyphosphate is preferable. These flame retardants may be used alone or in combination of two or more. These flame retardants may be coated with a thermosetting resin for improving water resistance, and surface treatment such as microencapsulation may be performed. Moreover, the flame retardant can be appropriately subjected to surface treatments such as a coupling process and a stearic acid process in order to improve the dispersibility in the acrylic resin composition.

The content of the flame retardant in the acrylic resin composition varies depending on the required degree of flame retardancy, but can be, for example, 20 to 200 parts by mass with respect to 100 parts by mass of the polymer. In addition, since adhesiveness decreases with the increase in content of the flame retardant, it is preferable to use the flame retardant which can express a flame retardance in a small quantity.

(Thermal Conductive Particles)

The acrylic resin composition according to the present invention can include thermal conductive particles. Examples of the thermal conductive particles include metal powder, metal oxide, metal hydroxide, boron nitride, silicon nitride, and carbon nitride. These thermal conductive particles can be used alone or in combination of two or more. The average particle size of the thermal conductive particles is preferably 1 to 100 μm, more preferably 10 to 50 μm. In order to improve the dispersibility in the acrylic resin composition, the thermal conductive particles can be appropriately subjected to a surface treatment such as a coupling treatment or a stearic acid treatment.

(Other Additives)

The acrylic resin composition according to the present invention can contain additives such as various silane coupling agents as necessary.

(Tensile Strength of the Acrylic Resin Composition)

The tensile strength after immersing the acrylic resin composition according to the present invention in oleic acid for 24 hours is 50% or more of the value of the tensile strength before immersing in oleic acid, and 60% or more is preferable, and 70% or more is more preferable. When this ratio (hereinafter also referred to as a maintenance ratio) is 50% or more, the acrylic resin composition exhibits high chemical resistance and oil resistance. The upper limit of the maintenance rate is not specifically limited, the higher one is preferable. The acrylic resin composition according to the present invention is solid at room temperature (15 to 25° C.), and the tensile strength can be measured. The tensile strength is a value measured according to JIS K 7114, and is specifically measured by a method described later. The acrylic resin composition according to the present invention has good resistance to not only oleic acid but also other industrial solvents such as toluene and other oils such as gasoline as shown in the examples described later compared with conventional acrylic resin compositions.

[Adhesive Composition, Base Material for Adhesive Sheet and Adhesive Sheet]

The adhesive composition according to the present invention includes the acrylic resin composition according to the present invention. The base material for adhesive sheets according to the present invention includes the acrylic resin composition according to the present invention. The adhesive sheet according to the present invention includes the adhesive composition according to the present invention and/or the base material for adhesive sheet according to the present invention.

The adhesive sheet according to the present invention can be composed of, for example, a base material for an adhesive sheet that is a support and an adhesive layer (resin layer) made of an adhesive composition provided on the base material for the adhesive sheet. The base material for the adhesive sheet and/or the adhesive composition is the base material for the adhesive sheet and/or the adhesive composition according to the present invention. The adhesive layer can be provided only on one surface of the base material for the adhesive sheet, or can be provided on both surfaces. The adhesive layer may be directly bonded on the base material for the adhesive sheet, or may be indirectly bonded via a primer layer or the like. Moreover, the adhesive sheet according to the present invention may be provided on one surface of a release sheet, and used as an adhesive sheet in a mode in which the release sheet is peeled off at the time of use.

The base material for an adhesive sheet according to the present invention can contain the acrylic resin composition of the present invention as an acrylic foam. As a method for producing the acrylic foam, for example, JP 2012-153900A discloses an acryl foam adhesive having a low density and bubbles finely and homogeneously dispersed therein, and a method for producing the same. Other methods include a method of adding a foaming agent to foam at the time of forming a sheet, or a method of adding the above-described hollow microfiller to form a sheet. When using the base material for adhesive sheets other than the base material for adhesive sheets of the present invention, examples of such a base material for an adhesive sheet include, various film such as polyester, polyimide and polyolefin films, nonwoven fabrics such as rayon and manila paper, metal foils, woven fabrics and the like.

The thickness of the adhesive layer made of the adhesive composition according to the present invention is not particularly limited, but can be, for example, 0.1 to 5 mm, and preferably 0.1 to 1 mm.

The adhesive sheet according to the present invention can be suitably used for adhesion of each member in, for example, parts of electronic device, automobile parts, building materials and the like.

EXAMPLES

[Evaluation Test Method]

The following evaluation items were performed in accordance with JIS K 7114 "Plastics—Methods of test for the determination of the effects of immersion in liquid chemicals".

<Tensile Strength>

Initial: A resin sheet cut to 10 mm×100 mm was pulled with STROGRAPH at a tensile speed of 300 mm/min, and the strength when the resin sheet was broken was measured.

After immersion in each chemical (oil component): A resin sheet cut to 10 mm×100 mm is immersed in each chemical (oleic acid, gasoline, toluene) for 24 hours at 23° C., and immediately after taking out, the resin sheet was pulled with STROGRAPH at a tensile speed of 300 mm/min, and the strength when the resin sheet was broken was measured.

<Dimensional Change Rate>

A resin sheet cut to 10 mm×100 mm was immersed in each chemical (oleic acid, gasoline, toluene) at 23° C. for 24 hours, and immediately after taking out, the width of the test sample was measured, and the dimensional change rate was calculated by the following equation.

Dimensional change rate=[(width of test sample after immersion)−(width of test sample before immersion (10 mm))]/width of test sample before immersion (10 mm)×100(%).

<Weight Change Rate>

The weight of the resin sheet cut into 10 mm×100 mm was measured. Thereafter, the test sample was immersed in each chemical (oleic acid, gasoline, toluene) at 23° C. for 24 hours. Immediately after taking out, the chemical on the surface of the test sample was wiped off, and the weight was measured. The weight change rate from before immersion was calculated by the following formula.

Weight change rate=[(weight of test sample after immersion)−(weight of test sample before immersion)]/weight of test sample before immersion×100(%).

Example 1

In a reaction vessel equipped with a stirrer, a reflux condenser, a thermometer, a UV lamp, and a nitrogen gas inlet, 60.0 parts by mass of 2-methoxyethyl acrylate, 27.5 parts by mass of 2-ethylhexyl acrylate, 12.5 parts by mass of acrylic acid, 0.01 part by mass of Irgacure 1173 (trade name, manufactured by BASF Japan) as a photopolymerization initiator, and 0.01 part by mass of n-dodecyl mercaptan as a chain transfer agent were added to prepare a monomer composition. A part of the monomer was polymerized by irradiating the monomer composition with UV light in a nitrogen atmosphere to prepare a syrupy composition. The concentration of the polymer in the syrupy composition was about 13% by mass, and the weight average molecular weight of the polymer was about 850,000.

With respect to 100 parts by mass of the syrupy composition, 0.1 part by mass of 1,6-hexanediol diacrylate (trade name: NK Ester A-HD-N, manufactured by Shin-Nakamura Chemical Co., Ltd.) as a crosslinking agent, 0.5 part by mass of Irgacure 1173 (trade name, manufactured by BASF Japan Ltd.) as a photopolymerization initiator were added and stirred uniformly. The air bubbles mixed during the stirring and mixing were removed by a defoaming operation to prepare a coating solution.

The coating solution was applied on a 50 μm thick polyethylene terephthalate (PET) film whose surface was treated with a release agent so that the thickness of the resulting resin layer was 0.5 mm. A 50 μm thick PET film was laminated on the layer made of the coating solution, and then irradiated with ultraviolet rays to prepare a resin sheet having a resin layer made of the acrylic resin composition according to the present invention. This resin sheet was subjected to the evaluation tests mentioned above. The results are shown in Table 1.

Examples 2 to 8, Comparative Examples 1 to 5

A resin sheet was prepared and evaluated in the same manner as in Example 1 except that the types and amounts of monomers in the monomer composition and the types and amounts of crosslinking agents were changed as shown in Table 1. The results are shown in Table 1.

In Examples 2 and 5, and Comparative Example 2, 15 parts by mass of a glass balloon (trade name: Sphericel 34P30, manufactured by Potters Barotini, average particle size: 35 μm) which is hollow glass beads as a filler was added with respect to 100 parts by mass of the total amount of monomers (obtained polymer) at the time of preparing the syrup composition. Noted that, in the evaluation of the tensile strength after immersion in gasoline and toluene of Comparative Examples 4 and 5, the resin sheet was broken before being set in the measuring device, and thus the measurement could not be performed.

Example 9

In a reaction vessel equipped with a condenser, a stirrer, and a thermometer, 60.0 parts by mass of 2-methoxyethyl acrylate, 27.5 parts by mass of 2-ethylhexyl acrylate, 12.5 parts by mass of acrylic acid and 0.2 parts by mass of 2,2'-azobisisobutyronitrile as a polymerization initiator were dissolved in 100 parts by mass of ethyl acetate. After nitrogen substitution, polymerization was carried out at 68° C. for 4 hours, and further 0.2 part by mass of 2,2'-azobisisobutyronitrile was added, followed by polymerization at 80° C. for 2 hours. The concentration of the polymer in the obtained solution was about 50% by mass, and the weight average molecular weight of the polymer was about 800,000. To this solution, 0.08 parts by mass of a tetrafunctional glycidyl compound (trade name: Tetrad-X, manufactured by Mitsubishi Gas Chemical Co., Ltd.) as a crosslinking agent was added and mixed to prepare a coating solution.

On the surface of the polyethylene terephthalate (PET) film having a thickness of 50 μm treated with a release agent, the coating solution was applied so that the thickness of the resulting resin layer was 0.1 mm, and then dried with a drier. This procedure was repeated 5 times, and the resin layer was laminated so that the thickness of the resin layer became 0.5 mm, and a resin sheet having a resin layer made of the acrylic resin composition according to the present invention was produced. The resin sheet was subjected to the evaluation tests mentioned above. The results are shown in Table 1.

TABLE 1

|  |  |  | Example |  |  |  |  |  |  |  |  |
|---|---|---|---|---|---|---|---|---|---|---|---|
|  |  |  | 1 | 2 | 3 | 4 | 5 | 6 | 7 | 8 | 9 |
| Polymerization method |  |  | UV |  |  |  |  |  |  |  | Solution |
| Syrup composition | Monomer 2-MEA | Part by mass | 60.0 | 60.0 | 60.0 | 48.0 | 48.0 | 85.0 | 87.5 | — | 60.0 |
|  | AM-90G | Part by mass | — | — | — | — | — | — | — | 87.5 | — |
|  | 2-EHA | Part by mass | 27.5 | 27.5 | 27.5 | 22.0 | 22.0 | 15.0 | — | — | 27.5 |
|  | n-BA | Part by mass | — | — | — | — | — | — | — | — | — |
|  | AA | Part by mass | 12.5 | 12.5 | 12.5 | 10.0 | 10.0 | — | 12.5 | 12.5 | 12.5 |
|  | ACMO | Part by mass | — | — | — | 20.0 | 20.0 | — | — | — | — |
| Cross-linking agent | HDDA | Part by mass | 0.1 | 0.1 | — | 0.1 | 0.1 | 0.1 | 0.1 | 0.1 | — |
|  | Tetrad-X | Part by mass | — | — | 0.08 | — | — | — | — | — | 0.08 |
| Photo polymerization | Irgacure1173 | Part by mass | 0.5 | 0.5 | 0.5 | 0.5 | 0.5 | 0.5 | 0.5 | 0.5 | — |
| Filler | Kind |  | — | Glass balloon | — | — | Glass balloon | — | — | — | — |
|  | Blending amount | Part by mass | — | 15.0 | — | — | 15.0 | — | — | — | — |
| Thickness |  | mm | 0.5 | 0.5 | 0.5 | 0.5 | 0.5 | 0.5 | 0.5 | 0.5 | 0.5 |
| Tensile strength | Initial | MPa | 0.82 | 0.93 | 1.06 | 2.89 | 1.96 | 0.59 | 0.81 | 0.14 | 0.98 |
|  | After immersing in oleic acid | MPa | 0.63 | 0.75 | 0.87 | 2.46 | 1.72 | 0.50 | 0.79 | 0.13 | 0.71 |
|  |  | Retention rate(%) | 76.3 | 80.6 | 82.2 | 85.1 | 87.6 | 85.4 | 97.5 | 95.6 | 72.3 |
|  | After immersing in gasoline | MPa | 0.77 | 0.91 | 1.01 | 2.79 | 1.87 | 0.56 | 0.77 | 0.13 | 0.94 |
|  |  | Retention rate(%) | 94.3 | 97.8 | 95.4 | 96.5 | 95.9 | 95.1 | 95.1 | 94.3 | 96.1 |
|  | After immersing in toluene | MPa | 0.25 | 0.32 | 0.39 | 1.18 | 0.83 | 0.25 | 0.52 | 0.09 | 0.32 |
|  |  | Retention rate(%) | 30.2 | 34.4 | 36.7 | 40.7 | 42.6 | 42.3 | 64.2 | 63.2 | 32.3 |
| Dimensional change rate | After immersing in oleic acid | % | 0 | 0 | 0 | 0 | 0 | 0 | 0 | 0 | 0 |
|  | After immersing in gasoline | % | 0 | 0 | 0 | 0 | 0 | 0 | 0 | 0 | 0 |
|  | After immersing in toluene | % | 40 | 40 | 38 | 30 | 30 | 35 | 10 | 10 | 40 |
| Mass change rate | After immersing in oleic acid | % | 25.0 | 22.0 | 20.0 | 14.0 | 13.0 | 1.5 | 1.9 | 2.1 | 28.0 |
|  | After immersing in gasoline | % | 21.3 | 19.9 | 18.6 | 12.0 | 12.0 | 10.3 | 6.3 | 5.9 | 27.6 |
|  | After immersing in toluene | % | 192.4 | 176.5 | 165.3 | 112.8 | 108.6 | 98.6 | 49.1 | 52.1 | 156.2 |

|  |  |  | Comparative Example |  |  |  |  |
|---|---|---|---|---|---|---|---|
|  |  |  | 1 | 2 | 3 | 4 | 5 |
| Polymerization method |  |  | UV |  |  |  |  |
| Syrup composition | Monomer 2-MEA | Part by mass | — | — | — | 27.5 | — |
|  | AM-90G | Part by mass | — | — | — | — | — |
|  | 2-EHA | Part by mass | 87.5 | 87.5 | 70.0 | 60.0 | — |
|  | n-BA | Part by mass | — | — | — | — | 95.0 |
|  | AA | Part by mass | 12.5 | 12.5 | 10.0 | 12.5 | 5.0 |
|  | ACMO | Part by mass | — | — | 20.0 | — | — |
| Cross-linking agent | HDDA | Part by mass | 0.1 | 0.1 | 0.1 | 0.1 | 0.1 |
|  | Tetrad-X | Part by mass | — | — | — | — | — |
| Photo polymerization | Irgacure1173 | Part by mass | 0.5 | 0.5 | 0.5 | 0.5 | 0.5 |
| Filler | Kind |  | — | Glass balloon | — | — | — |
|  | Blending amount | Part by mass | — | 15.0 | — | — | — |
| Thickness |  | mm | 0.5 | 0.5 | 0.5 | 0.5 | 0.5 |
| Tensile strength | Initial | MPa | 0.95 | 1.00 | 2.76 | 0.83 | 0.91 |
|  | After immersing in oleic acid | MPa | 0.03 | 0.02 | 0.15 | 0.11 | 0.06 |
|  |  | Retention rate(%) | 3.4 | 2.0 | 5.6 | 13.3 | 7.1 |
|  | After immersing in gasoline | MPa | 0.02 | 0.03 | 0.03 | N.D | N.D |
|  |  | Retention rate(%) | 2.1 | 2.9 | 3.5 | — | — |
|  | After immersing in toluene | MPa | 0.02 | 0.04 | 0.06 | N.D | N.D |
|  |  | Retention rate(%) | 2.0 | 4.0 | 2.3 | — | — |
| Dimensional change rate | After immersing in oleic acid | % | 72 | 70 | 70 | 70 | 70 |
|  | After immersing in gasoline | % | 65 | 60 | 89 | 100 | 123 |
|  | After immersing in toluene | % | 70 | 60 | 62.3 | 50 | 76 |

TABLE 1-continued

| | | | | | | | |
|---|---|---|---|---|---|---|---|
| Mass change rate | After immersing in oleic acid | % | 486.0 | 475.0 | 465.3 | 404.2 | 486.0 |
| | After immersing in gasoline | % | 236.0 | 226.5 | 263.0 | 291.2 | 302.1 |
| | After immersing in toluene | % | 441.0 | 408.7 | 422.3 | 432.5 | 469.0 |

2-MEA: 2-methoxyethyl acrylate
AM-90G: Methoxy acrylate (poly) ethylene glycol (n = 9)
2-EHA: 2-ethylhexyl acrylate
n-BA: n-butyl acrylate
AA: Acrylic acid
ACMO: Acryloylmorpholine
HDDA: 1,6-hexanediol diacrylate
Tetrad-X: trade name, manufactured by Mitsubishi Gas Chemical Company, Inc., N,N,N',N',-tetraglycidyl-m-xylenediamine

The invention claimed is:

1. An acrylic resin composition comprising a polymer containing a unit derived from a monomer represented by the following formula (1):

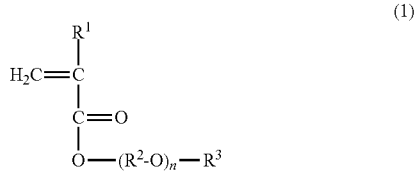

$R^1$ represents a hydrogen atom or a methyl group, $R^2$ represents an alkylene group having 2 to 4 carbon atoms, and $R^3$ represents an alkyl group having 1 to 10 carbon atoms, n represents an integer of 1,
wherein the proportion of the unit derived from the monomer represented by formula (1) contained in the polymer is 60 to 90% by mass with respect to 100% by mass of the total monomer units constituting the polymer,
the polymer further comprises a unit derived from a carboxylic acid-containing (meth)acrylic monomer and the proportion of the unit derived from the carboxylic acid-containing (meth)acrylic monomer contained in the polymer is 0% by mass or 12.5 to 20% by mass with respect to 100% by mass of the total monomer units constituting the polymer,
the polymer further comprises a unit derived from (meth)acrylic acid alkyl ester, and the proportion of the unit derived from (meth)acrylic acid alkyl ester contained in the polymer is 0% by mass or 10 to 27.5% by mass with respect to 100% by mass of the total monomer units constituting the polymer,
the polymer comprises at least one of the unit derived from the carboxylic acid-containing (meth)acrylic monomer and the unit derived from (meth)acrylic acid alkyl ester,
the acrylic resin composition further comprises at least one crosslinking agent selected from the group consisting of polyfunctional (meth)acrylic monomers, polyfunctional (meth)acrylic oligomers, and bifunctional or higher functional glycidyl group-containing compounds, and
the tensile strength after the acrylic resin composition is immersed in oleic acid for 24 hours is 50% or more of the value of the tensile strength before being immersed in oleic acid.

2. The acrylic resin composition according to claim 1, wherein the carboxylic acid-containing (meth)acrylic monomer is (meth)acrylic acid.

3. The acrylic resin composition according to claim 1, wherein the monomer represented by the formula (1) is at least one monomer selected from the group consisting of methoxyethyl (meth)acrylate, and ethoxyethyl (meth)acrylate.

4. The acrylic resin composition according to claim 1, wherein the polymer further comprises a unit derived from a nitrogen-containing acrylic monomer, and the proportion of the unit derived from the nitrogen-containing acrylic monomer contained in the polymer is 1 to 50% by mass with respect to 100% by mass of the total monomer units constituting the polymer.

5. The acrylic resin composition according to claim 4, wherein the nitrogen- containing acrylic monomer is at least one monomer selected from the group consisting of (meth)acrylamide, N-alkyl substituted (meth)acrylamide, N,N-dialkyl substituted (meth)acrylamide, and acryloylmorpholine.

6. The acrylic resin composition according to claim 1, further comprising a hollow microfiller having an average particle diameter of 1 to 100 μm.

7. The acrylic resin composition according to claim 6, wherein the hollow microfiller is a hollow glass bead, and the content of the hollow microfiller is 2 to 50 parts by mass with respect to 100 parts by mass of the polymer.

8. An adhesive composition which is composed of the acrylic resin composition according to claim 1.

9. A base material for an adhesive sheet comprising the acrylic resin composition according to claim 1.

10. An adhesive sheet comprising the adhesive composition according to claim 8.

11. An adhesive sheet comprising the base material for an adhesive sheet according to claim 9.

12. An adhesive sheet comprising a base material and an adhesive layer formed on the base material, wherein at least one of the base material and the adhesive layer comprises the acrylic resin composition according to claim 1.

13. The acrylic resin composition according to claim 1, wherein the proportion of the unit derived from the carboxylic acid-containing (meth)acrylic monomer contained in the polymer is 12.5 to 20% by mass with respect to 100% by mass of the total monomer units constituting the polymer.

14. The acrylic resin composition according to claim 1, wherein the proportion of the unit derived from (meth)acrylic acid alkyl ester contained in the polymer is 10 to 27.5% by mass with respect to 100% by mass of the total monomer units constituting the polymer.

* * * * *